United States Patent
Park et al.

(12) United States Patent Park et al.

(10) Patent No.: US 6,788,858 B1
(45) Date of Patent: Sep. 7, 2004

(54) BUNDLE TUBE TYPE OPTICAL CABLE

(75) Inventors: Euy-don Park, Gumi-shi (KR);
Byung-gon Lee, Gumi-shi (KR);
Jin-cheol Ahn, Busan-shi (KR);
Yon-soo Ahn, Namyangiu-shi (KR)

(73) Assignee: LG Cable Ltd., Seoul (KR)

( * ) Notice: Subject to any disclaimer, the term of this patent is extended or adjusted under 35 U.S.C. 154(b) by 76 days.

(21) Appl. No.: 10/295,824

(22) Filed: Nov. 18, 2002

(30) Foreign Application Priority Data

Nov. 19, 2001 (KR) ................................. 10-2001-0072054
Nov. 19, 2001 (KR) ................................. 10-2001-0072052

(51) Int. Cl.$^7$ ................................................ G02B 6/44
(52) U.S. Cl. ...................... 385/109; 385/106; 385/113
(58) Field of Search ................................ 385/100–115

(56) References Cited

U.S. PATENT DOCUMENTS 5,345,526 A * 9/1994 Blew .......................... 385/112
2003/0049002 A1 * 3/2003 Bosisio et al. .............. 385/109

* cited by examiner

Primary Examiner—Phan T. H. Palmer
(74) Attorney, Agent, or Firm—Nath & Associates PLLC; Harold L. Novick

(57) ABSTRACT

A bundle tube type optical cable is disclosed. A bundle tube type optical cable comprises: a bundle of optical fiber tubes being arranged in the middle portion of the optical cable and each containing at least two optical fiber cores loosely arranged therein; a first water-blocking layer protecting the optical fiber cores in the optical fiber tube from external moisture by a water-blocking material filled in the inner space of the tube; an inner shell made of aluminum material enclosing the bundle of optical fiber tubes with a predetermined gap; a second water-blocking layer protecting the optical fiber tubes from external moisture by the water-blocking material filled in the inner space of the inner shell; and an outer sheath made of plastic material enclosing the outer surface of the inner shell. In this way, since the outer sheath layer enclosing the optical fiber tubes is constructed in a double layer structure of an inner shell of aluminum material and an outer sheath of polyethylene, the optical cable can be bent easily, can prevent moisture penetration into the optical fibers and can prevent shrinkage at low temperature.

14 Claims, 7 Drawing Sheets

BUNDLE TUBE TYPE OPTICAL CABLE

BACKGROUND OF THE INVENTION

1. Field of the Invention

The present invention relates to a bundle tube type optical cable, and more particularly, to a bundle tube type optical cable which makes an optical cable bend easily, prevents moisture from penetrating the optical fibers and prevents the optical cable from shrinking in low temperatures by constructing an outer sheath layer enclosing the exterior of a bundle of optical fiber tubes containing optical fibers in the form of a double layer structure consisting of an inner shell made of aluminum material and an outer sheath made of polyethylene.

2. Description of the Related Art

Typically, optical cables are being widely used for transferring electric and electronic signals for TV, computer, telephone and the like. Particularly, they are getting more popularity because they can transfer enormous information rapidly as compared to coaxial cables. However, in respect to such an optical cable, the number of optical fibers to be arranged therein becomes different depending upon its applications, and accordingly there occurs a need for a different structure thereof. For this reason, optical cables having various structures have been developed.

Among them, a bundle tube type optical cable is typical, which is formed in such a manner that at least two optical fiber tubes, each containing two or more optical fibers which are embedded in a longitudinal direction, are arranged in the middle of the optical cable and the cable is wrapped, in sequence from the cable outwards, with a central tube, auxiliary tension wires and an outer sheath layer made of polyethylene. This bundle tube type optical cable can contain a plurality of optical fibers in the optical cable with a small diameter, and so it is economical compared to optical cables with structures of other types. Particularly, since the process of manufacturing the optical fiber tube can be performed along with the process of manufacturing a central tube and other processes of manufacturing an optical cable and also the manufacturing process is simple, it is generally used.

However, in respect to such a bundle tube type optical cable, the optical fiber contained in the optical fiber tube has a small diameter, is weak against any impact, and is particularly apt to be damaged by contact with moisture. Thus, that optical cable must have a structure capable of protecting the optical fiber from moisture and external impact. Also, that optical cable requires bending when connected or depending on the type of ground the cable is buried or disposed under. Because of this, what often occurs is that the optical cable has to be strained, and accordingly the cable itself must have enough elasticity and flexibility. In addition, it is often occurred that such an optical cable is exposed to the external environment, for example, when it is buried and is not affected by a change in temperature. With respect to the physical and mechanical properties, the optical cable must satisfy various requirements. Therefore, a variety of bundle tube type optical cables have been proposed in order to satisfy those requirements.

Referring to FIGS. 1 to 6, the structure of a conventional bundle tube type optical cable will now be described.

Firstly, FIG. 1 is a cross-sectional view showing a bundle tube type optical cable according to a first example of the conventional art, and FIG. 2 is an enlarged sectional view of an optical fiber tube in the optical cable of FIG. 1.

As shown therein, the conventional bundle tube type optical cable (A) according to the first example includes: a bundle of optical fiber tubes 6 each containing at least two optical fiber cores 2; a first water-blocking layer 4 protecting the optical fiber cores 2 in the optical fiber tubes 6 from external moisture by the water-blocking material filled in the inner space of each optical fiber tube 6; a water-blocking tape 10 enclosing the bundle of optical fiber tubes 6; a second water-blocking layer 8 protecting the optical fiber tubes 6 from external moisture by the water-blocking material filled between the water-blocking tape 10 and the optical fiber tubes 6; an outer sheath 14 enclosing the outer surface of the water-blocking tape 10 and protecting the optical cable (A) from external impact; and external tension wires 12 being arranged at a predetermined interval along the length of the outer sheath 14 and having a predetermined tension force.

In respect to the constructed optical cable in the conventional art, the outer sheath 14 is made of polyethylene and the water-blocking material filled in the first and second water-blocking layers 4 and 8 includes jelly or water-blocking powder.

However, the conventional optical cable is provided with no means protecting optical fiber tubes in the outer sheath made of polyethylene, but only the water-blocking tape enclosing the optical fiber tubes. Thus the outer sheath compresses the optical fiber tube to thereby deteriorate the characteristics of the optical fiber core contained in the optical fiber tube. That is, because the conventional optical cable is provided with no means, protecting the optical fiber cores from external impact, excepting the outer sheath made of polyethylene, it cannot protect the optical fiber cores in the optical fiber tube properly and but also may compress the optical fiber tube by the outer sheath itself. As a result, the optical fibers are easily damaged by such pressure.

To solve such problems of the conventional bundle tube type optical cable, there was proposed another conventional bundle tube type optical cable of a different configuration as shown in FIG. 3.

FIG. 3 is a cross sectional view showing a bundle tube type optical cable according to a second example of the conventional art. The conventional bundle tube type optical cable (A) shown therein, which is employed by Alcatel, has the same structure as the optical cable of the first example as shown in FIGS. 1 and 2, except that steel tape 13 is stacked between the water-blocking tape 10 and the outer sheath 14.

In the conventional optical cable of such a configuration, since the steel tape 13 having a high strength is arranged between the water-blocking tape 10 and the outer sheath 14 and protects the optical fibers from external impact and compression from the outer sheath, this optical cable can solve the problems of the optical cable of the first example. But, the optical cable of this example must have bending properties such as proper elasticity and flexibility. However, in the optical cable of such a structure, the strength of the steel tape is extremely high and accordingly there still exists a problem that such bending properties are deteriorated if not carrying out the process of forming a corrugation. Moreover, for forming the steel tape well, it must be bonded by a hot melt adhesive, which makes the manufacturing process complicated and increases the manufacturing cost.

FIG. 4 is a cross sectional view showing a bundle tube type optical cable according to a third example of the conventional art.

The bundle tube type optical cable of the third example as shown in FIG. 4, which is being employed by Lucent Technology, has a similar structure to the second example illustrated in FIG. 3. That is, that optical cable has the same structure as the optical cable of the first example as shown in FIGS. 1 and 2, except that a plastic tube 15 and steel tape 13 are stacked between the water-blocking tape 10 and the outer sheath 14.

However, the optical cable of such a configuration cannot solve the problems also occurring in the second example too. Moreover, the plastic tube is enclosed with the steel tape after forming the plastic tube around the optical fiber tube, which makes manufacturing more complicated and increases the manufacturing cost.

FIG. 5 is a cross sectional view showing the structure of a conventional bundle tube type optical cable according to a fourth example of the conventional art.

The optical cable as shown in FIG. 5, which is being employed by Pirelli, is similar to the structure of the optical cable of the first three examples. That is, it has the same structure as the optical cable of the first example, except that an inner tube 17 is made of plastic, instead of the water-blocking tape 10, is arranged around the optical fiber tube, the exterior of the inner tube 17 is wrapped with a paper tape 18 and the inner tube 17 is formed with a quick access window 19.

FIG. 6 is a cross sectional view showing a bundle tube type optical cable according to the fifth example of the conventional art.

In the conventional optical cable as shown in FIG. 6, at least two optical fiber tubes 6 containing a plurality of optical fibers 2 are enclosed with a tube 14 made of plastic in the same way as the fourth example of the conventional art, except that no water-blocking material is filled in the inner space 8 of the plastic tube 14 and in the inner space 4 of the optical fiber tube 6, the outer surface of the plastic tube 14 is not wrapped with a separate water-blocking tape or paper tape and the tube 14 serves as the outer sheath.

In the optical cable of the fifth example, the optical fiber tubes 6 are enclosed with the plastic tube 14 as an outer sheath. The plastic tube has a certain amount of flexibility unlike the steel tape, and thus it can increase the bending properties of the optical cable to a certain extent. However, since the outer sheath is formed by enclosing the exterior of the plastic material with the paper tape or without a separate water-blocking member, it is difficult to obtain sufficient water-blocking effects, and as a result the optical fibers are not protected from outside moisture.

Moreover, in the above-described optical cable of the first four examples, a water-blocking jelly material is used as an internal or external water-blocking material for protecting the optical fibers from moisture penetrates from the outside and thus a certain amount of water-blocking effect can be expected. However, when connecting or distributing the cable, the optical fibers must be extracted from the optical cable. At this time, if the jelly-like water-blocking material, as in the conventional examples, is filled within the tube, the jelly also must be removed from the cable to extract the optical fibers, which makes one's hands or instruments contaminated.

In addition, in the manufacturing of the optical cable of the conventional examples, it takes much time to fill the jelly into the cable due to the viscosity of the jelly, thereby decreasing the productivity of the manufacturing process, the yield of the product and increases the cost. Moreover, since the jelly does not fully fill the empty spaces between the tubes, it is difficult to obtain sufficient waterproofing properties.

Particularly, it is impossible to expect the jelly-like water-blocking material to have any effect in absorbing external any impact. Thus, such a water-blocking material cannot obtain sufficient pressure properties even when filling the central tube with it.

By these problems of the conventional optical cable, there is an urgent need for the optical cable having such a structure that can acquire sufficient waterproofing properties and pressure properties, can satisfy physical and mechanical properties needed for the optical cable, can be manufactured by a simple process and can expect an improvement in the yield of the product and the process productivity.

SUMMARY OF THE INVENTION

It is, therefore, an object of the present invention to provide a bundle tube type optical cable which improves the bending properties of the optical cable simultaneously with the pressure properties and waterproofing properties thereof by embedding an inner shell of aluminum with good flexibility between optical fiber tubes containing a plurality of optical fibers and an outer sheath made of polyethylene.

It is another object of the present invention to provide a bundle tube type optical cable which can prevent contamination of one's hands or instruments, improve the waterproofing properties of the optical cable and accordingly offer excellent physical and mechanical properties by filling a mixed powder of water-blocking powder and inorganic powder in the inner space of an inner shell of aluminum and in the inner space of each of optical fiber tubes.

In accordance with the present invention a bundle tube type optical cable comprises: a bundle of optical fiber tubes being arranged in the middle portion of the optical cable and each containing at least two optical fiber cores loosely arranged therein; a first water-blocking layer protecting the optical fiber cores in the optical fiber tube from external moisture by a water-blocking material filled in the inner space of the tube; an inner shell made of aluminum material enclosing the bundle of optical fiber tubes with a predetermined gap; a second water-blocking layer protecting the optical fiber tubes from external moisture by the water-blocking material filled in the inner space of the inner shell; and an outer sheath made of plastic material enclosing the outer surface of the inner shell.

In a preferred embodiment, the optical fiber tube has an outer diameter of less than 2.0 mm and a thickness of less than 0.2 mm.

In addition, the optical fiber tube contains 24 or less optical fiber cores, and has an optical fiber lamination factor of more than 60% which is calculated by the following formula;

$$\text{Optical Fiber Lamination Factor} = \pi \times R_e^2 / \pi \times R_i^2$$

(wherein $R_e$ is the reduced radius of the optical fiber cores (the radius of a circle on the assumption that a plurality of optical fiber cores is one circle), and $R_i$ is the internal radius of the optical fiber tube).

Further, the optical fiber tube is made of any one material selected from the group consisting of poly vinyl chloride (PVC), polyester amide copolymer, soft ethylene-propylene copolymer, styrene-butadiene rubber, polyethylene, ethylene vinyl acetate (EVA), and polyester elastomer.

Also, water-blocking material of the first water-blocking material and the second water-blocking material is a mixed powder of water-blocking powder and inorganic powder.

Preferably, the inorganic powder includes any one material selected from group consisting of talc, carbonate and silicate, and the water-blocking powder preferably includes any one material selected from the group consisting of sodium carboxymethyl cellulose, polyacrylic acid salt and poly vinyl alcohol-sodium acrylate.

In addition, the proportion of the water-blocking powder in the total weight of the mixed powder is less than 70% by weight.

Further, the inner shell of aluminum material has a tensile strength of 7~9 kg/25 mm$^2$ and a longitudinal elongation of more than 25% and includes high purity aluminum containing more than 99.3% aluminum.

In another preferred embodiment, one surface or opposite surfaces of the inner shell of aluminum are coated with thermoplastic resin.

In still another preferred embodiment, the optical cable further comprises a steel tape provided on the outer circumferential surface of the outer sheath of plastic material and an epidermal layer of plastic provided on the outer circumferential surface of the steel tape.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will now be described with reference to the accompanying drawings.

Figure 1:
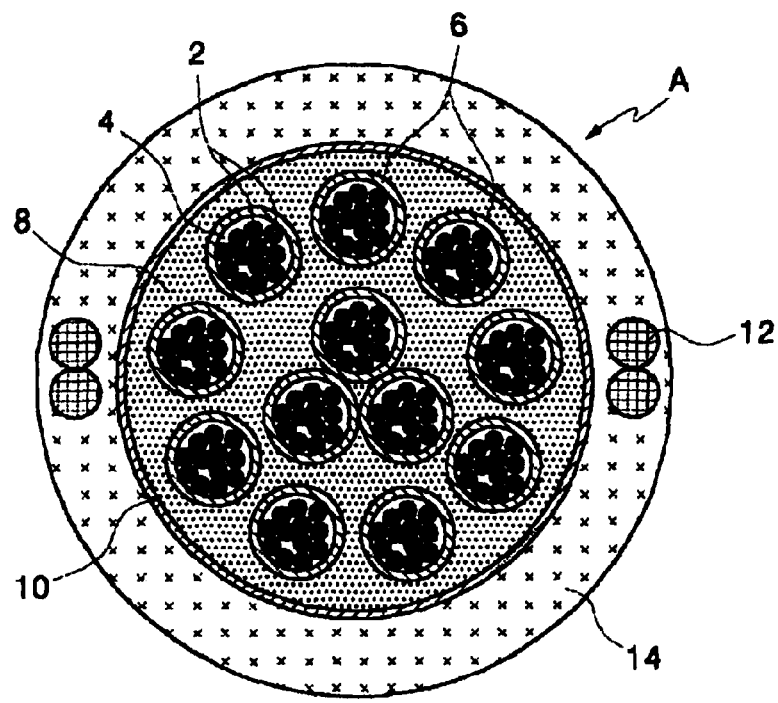
FIG. 1 is a cross-sectional view showing a bundle tube type optical cable according to a first example of the conventional art.
Figure 2:
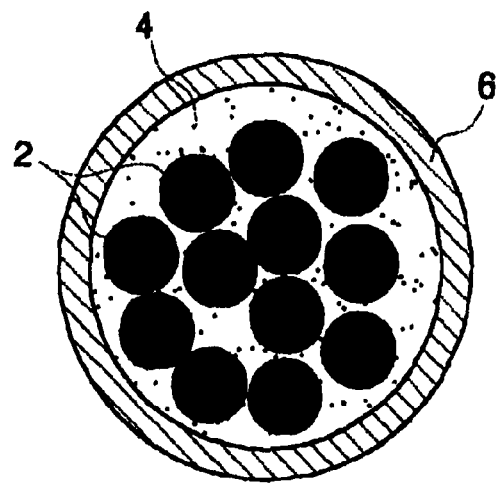
FIG. 2 is an enlarged sectional view of an optical fiber tube in the optical cable of FIG. 1.
Figure 3:
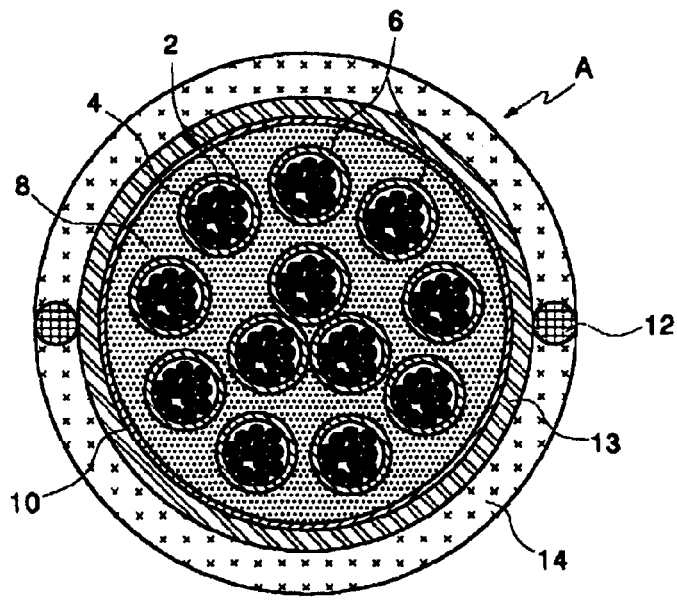
FIGS. 3 to 6 are cross sectional views showing a bundle tube type optical cable according to second to fifth examples of the conventional art.
Figure 4:
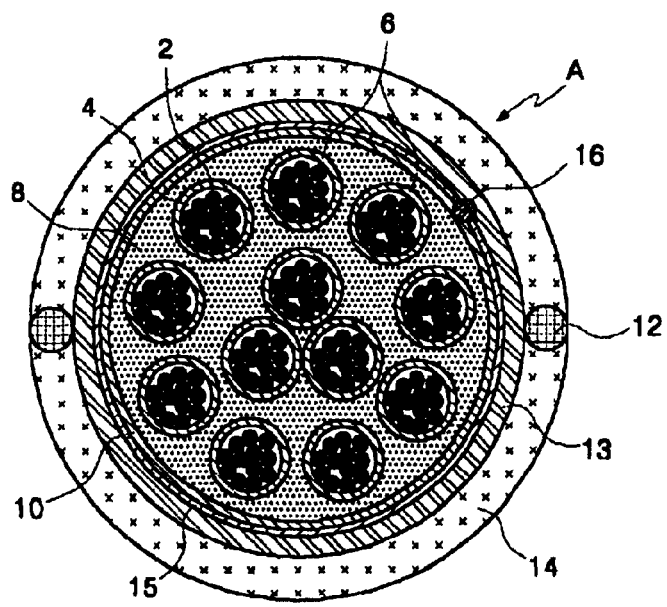
Figure 5:
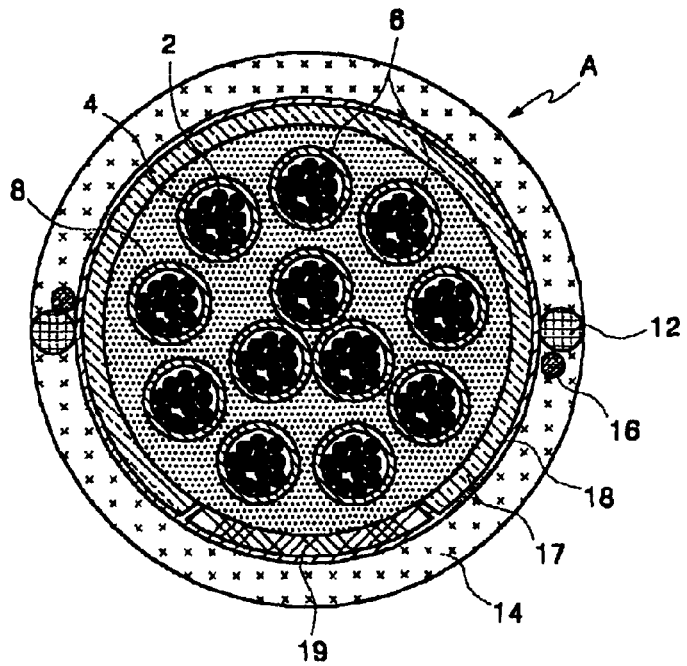
Figure 6:
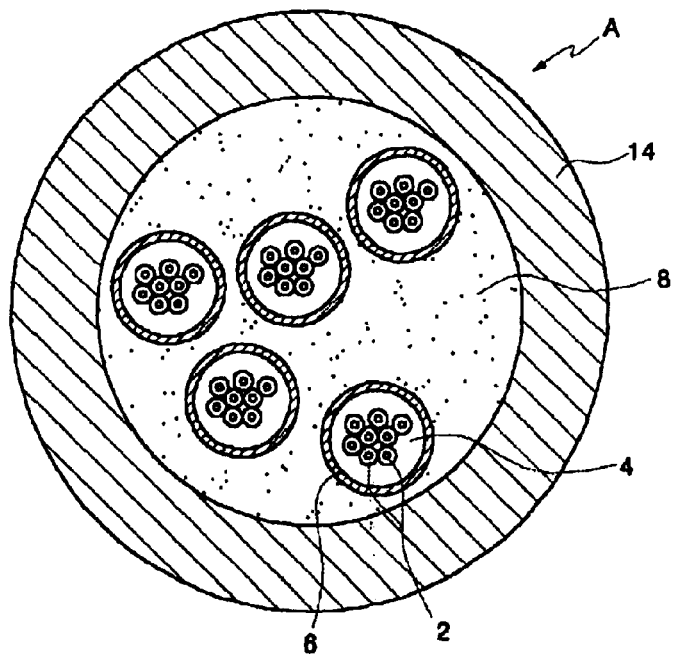
Figure 7:
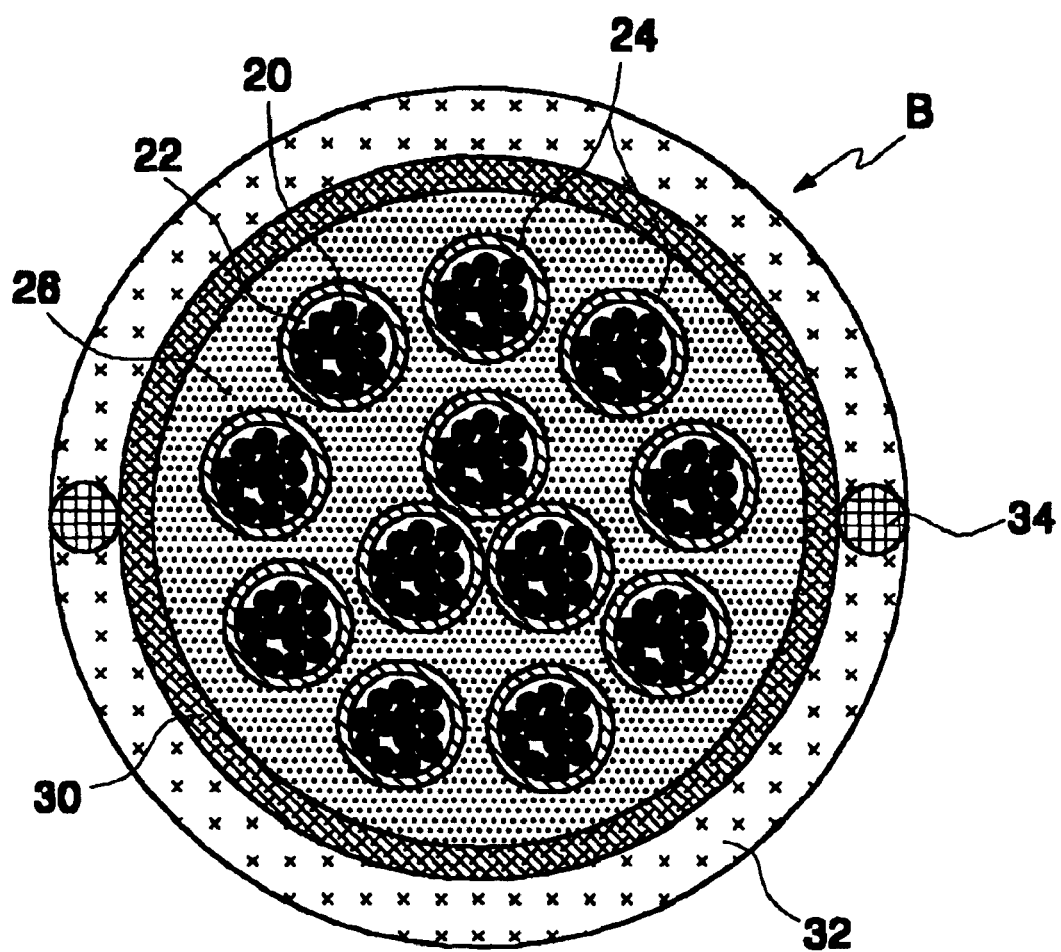
FIG. 7 is a cross sectional view showing a bundle tube type optical cable according to one embodiment of the present invention.

Firstly, FIG. 7 is a cross sectional view showing a bundle tube type optical cable according to one embodiment of the present invention.

As shown in FIG. 7, the bundle tube type optical cable (B) according to the one embodiment of the present invention includes: a bundle of optical fiber tubes 24 being arranged in the middle portion of the optical cable and each containing at least two optical fiber cores 20; a first water-blocking layer 22 protecting the optical fiber cores 20 in the optical fiber tube 24 from external moisture by a water-blocking material filled in the inner space of the tube 24; an inner shell 30 made of aluminum material enclosing the bundle of optical fiber tubes 24 with a predetermined gap; a second water-blocking layer 26 protecting the optical fiber tubes 24 from external moisture by the water-blocking material filled in the inner space of the inner shell 30 and the optical fiber tubes 24; and an outer sheath 32 made of plastic enclosing the outer surface of the inner shell 30.

In the optical cable according to this embodiment, the outer sheath layer enclosing the bundle of optical fiber tubes has a double layer structure consisting of the inner shell 30 of aluminum material enclosing the exterior of the optical fiber tubes 24 and the outer sheath 32 made of plastic enclosing the outer surface of the inner shell 30. By this structure, since the optical fiber tubes 24 are completely separated from the outer sheath 32 by the inner shell 30 made of aluminum, the optical fiber cores 20 in the optical fiber tubes 24 can be protected from impact transferred from the outside and the pressure applied via the outer sheath 32. Also, unlike the steel tape used in the conventional examples, the aluminum inner shell 30 has a certain amount of flexibility. Therefore it can be easily bent without carrying out the process of forming a corrugation and thus can improve the bending properties of the optical cable.

Additionally, in the case of enclosing the optical fiber tubes with the plastic tube in the conventional examples, there is a possibility of degrading the characteristics of the optical fibers due to moisture penetration into the plastic with the passage of time. In this embodiment, however, it is possible to improve the water blocking properties of the optical cable by arranging the aluminum inner shell 30 on the inner surface of the outer sheath 32 and blocking moisture introduced from the outside.

In this way, in the bundle tube type optical cable according to the present invention, the optical fiber tube 24 preferably has an outer diameter of less than 2.0 mm and a thickness of less than 0.2 mm. It is made possible to obtain a bundle tube type optical cable which is excellent from an economic viewpoint only by containing a plurality of optical fiber cores 20 in a tube with a limited, small diameter. If the outer diameter of the optical fiber tube 24 is more than 2.0 mm, such inherent characteristics of the bundle tube type optical cable are lost. Consequently, in the case where the outer diameter of the optical fiber tube 24 is more than 2.0 mm, an optical cable with a different structure than the bundle tube type optical cable, for example, a ribbon tube type optical cable is more preferable.

In addition, the optical fiber tube 24 contained in the middle core of the optical cable according to the present invention must contain 24 or less optical fiber cores 20. At this time, the optical cable preferably has an optical fiber lamination factor of more than 60%, which is calculated by the formula on this page. Here, the optical fiber lamination factor indicates the proportion of the sectional area of the optical fiber cores 20 contained in the optical fiber tube 24. If the space factor is less than 60%, the advantages of the bundle tube type optical cable with excellent economic efficiency cannot be employed. If the space factor is more than 60% (that is, if 24 or more optical fiber cores 20 are contained in the optical fiber tube 24), the size of the optical fiber tube 24 is increased. Therefore, as described above, an optical cable with a different structure than the bundle tube type optical cable, for example, a ribbon tube type optical cable is more preferable.

$$\text{Optical Fiber Lamination Factor} = \pi \times R_e^2 / \pi \times R_t^2$$

In this formula, $R_e$ is the reduced radius of the optical fiber cores (the radius of a circle on the assumption that a plurality of optical fiber cores is one circle), and $R_t$ is the internal radius of the optical fiber tube.

Preferably, as described above, the optical fiber tube 24 is made of thermoplastic resin. The thermoplastic resin includes commonly used resin. More preferably, it includes any one material selected from the group consisting of poly vinyl chloride (PVC), polyester amide copolymer, soft ethylene-propylene copolymer, styrene-butadiene rubber, polyethylene, ethylene vinyl acetate (EVA), and polyester elastomer.

In addition, in the optical cable according to the present invention, the water-blocking material filled in the first water-blocking layer 22 and the second water-blocking layer 26 includes all the water blocking members, which have been used for conventional optical cables. Preferably, it includes a mixed powder of water blocking powder and inorganic powder.

Namely, in the optical cable according to the present invention, it is possible to prevent one's hands or instruments from being contaminated by the jelly when connecting or distributing the cable by using the mixed powder of water blocking powder and inorganic powder instead of conventionally used jelly-like water-blocking material. Moreover, this powder has no viscosity unlike the jelly and thus can be uniformly filled in the tube, thereby acquiring a sufficient waterproofing performance.

Although not specifically limited, the inorganic powder of the present invention preferably includes one material selected from group consisting of talc, carbonate and silicate. Also, the water-blocking powder of the present invention preferably includes any one material selected from the group consisting of sodium carboxymethyl cellulose, polyacrylic acid salt and poly vinyl alcohol-sodium acrylate, but the present invention is not limited to them.

Regarding the mixing proportion of water-blocking powder to inorganic powder, the proportion of the water-blocking powder in the total weight of the mixed powder is preferably less than 70% by weight. If the water-blocking powder is more than 70% by weight, the rate of the inorganic powder serving as the filling material becomes too small, thus degrading the mechanical and physical properties of the optical cable.

In the optical cable of the present invention, the inner shell 30 of aluminum material is preferably produced in such a manner that it has a tensile strength of 7~9 kg/25 mm$^2$ and a longitudinal elongation of more than 25% and it is made from high purity aluminum containing more than 99.3% aluminum.

The inner shell 30 made of such an aluminum material has a sufficient strength so it can sufficiently protect the optical fibers from the impact transferred from the outside and the pressure applied via the outer sheath. Also, since it has flexibility unlike conventional steel tape, the bending properties of the optical cable can be improved even if a separate corrugation is not formed.

Further, in the optical cable according to the present invention, it is preferable that thermoplastic resin is coated on one surface (partially) of the inner shell 30 or opposite surfaces (entirely) thereof. In this way, when at least one surface of the inner shell 30 is coated with thermoplastic resin, the process of manufacturing the optical cable can be simplified. That is, in case of the conventional optical cable, the process of bonding a steel tape by a hot melt adhesive must be carried out to form the steel tape around a water-blocking tape, which makes the process more complicated. However, in the present invention, it is possible to reduce the number of process steps since the bonding of the steel tape using the hot melt adhesive can be omitted by coating one surface or opposite surfaces of the inner shell 30 with thermoplastic resin.

Figure 8:
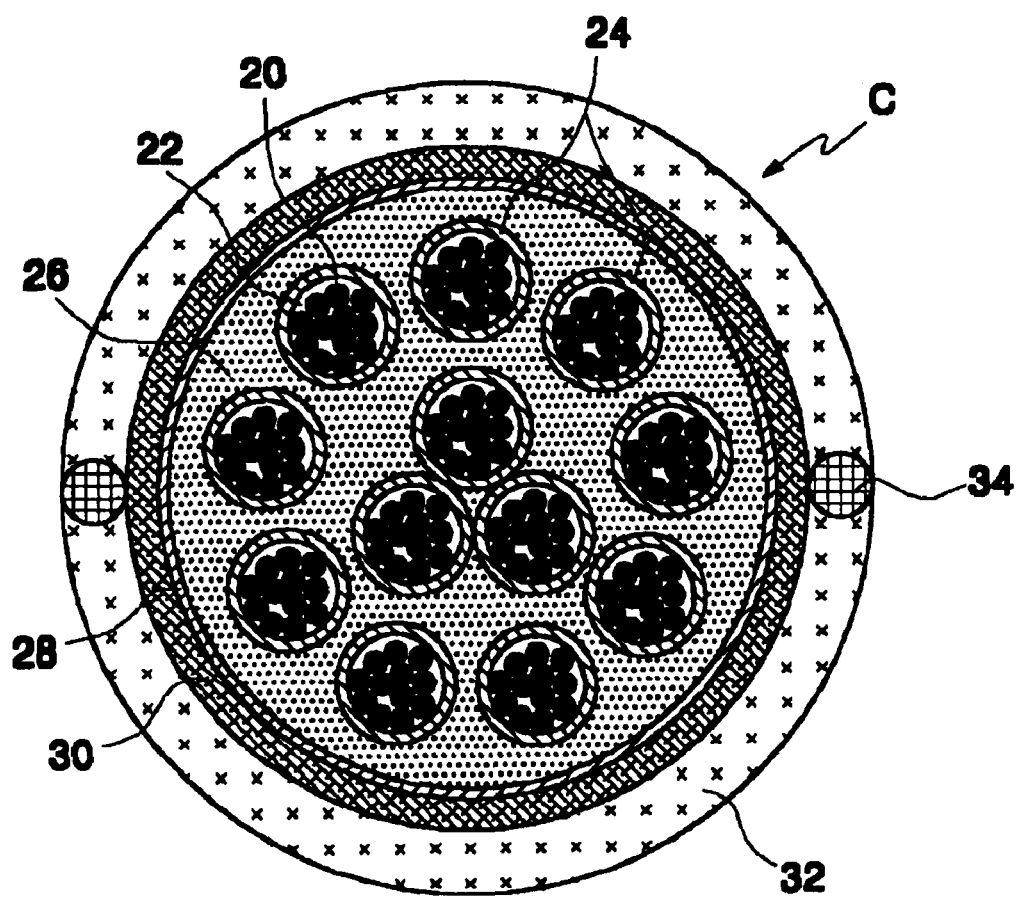
FIG. 8 is a cross sectional view showing a bundle tube type optical cable according to another embodiment of the present invention.

Additionally, in the optical cable of the present invention, the water-blocking effect can be maximized by additionally stacking the water-blocking tape 28 on the interior of the inner shell 30 of aluminum material. The construction therefore is well illustrated in the optical cable (C) of FIG. 8. As illustrated in FIG. 8, the water-blocking tape 28 is additionally stacked on the inner surface of the inner shell 30 and protects moisture introduced from the outside from being transferred to the optical fiber tube 24 through the second water-blocking layer 28, thereby increasing the water-blocking effect.

Figure 9:
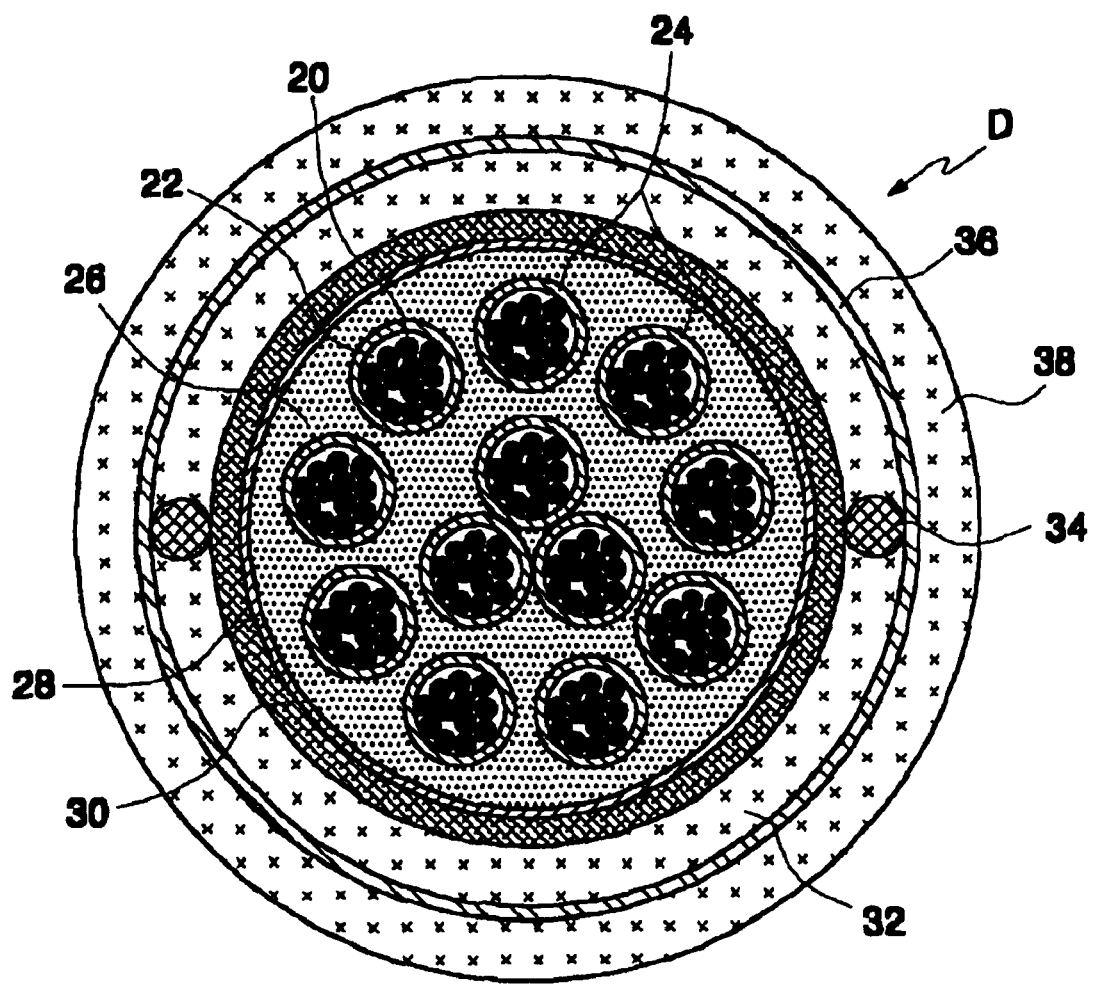
FIG. 9 is a cross sectional view showing a bundle tube type optical cable according to still another embodiment of the present invention.

Moreover, the optical cable of the present invention can additionally provide a steel tape 36 on the outer circumferential surface of the outer sheath 32 and an epidermal layer 38 made of plastic material bonded to the outer circumferential surface of the steel tape 36. The construction therefore is well illustrated in the optical cable (D) of FIG. 9. That is, the optical cable has a double outer sheath layer structure in which the outer sheath 32 of plastic material is bonded on the outer surface of the inner shell 30 of aluminum, the steel tape 36 is bonded on the outer surface of the outer sheath 32 of plastic and the epidermal layer 38 of plastic material is bonded on the outer surface of the steel tape 36.

In this manner, in case of additionally forming the steel tape 36 and the epidermal layer 38 on the outer sheath 32 of plastic material, the process of manufacturing the optical cable can be more complicated and the bending properties of the optical cable can be degraded, while the strength of the optical cable and the waterproofing properties thereof can be sharply improved. Particularly, in case of laying the optical cable at the site to which a large impact from the outside may be transferred and moisture penetration can be expected, it is preferable to use the bundle tube type optical cable of such a double outer sheath layer structure.

Figure 10:
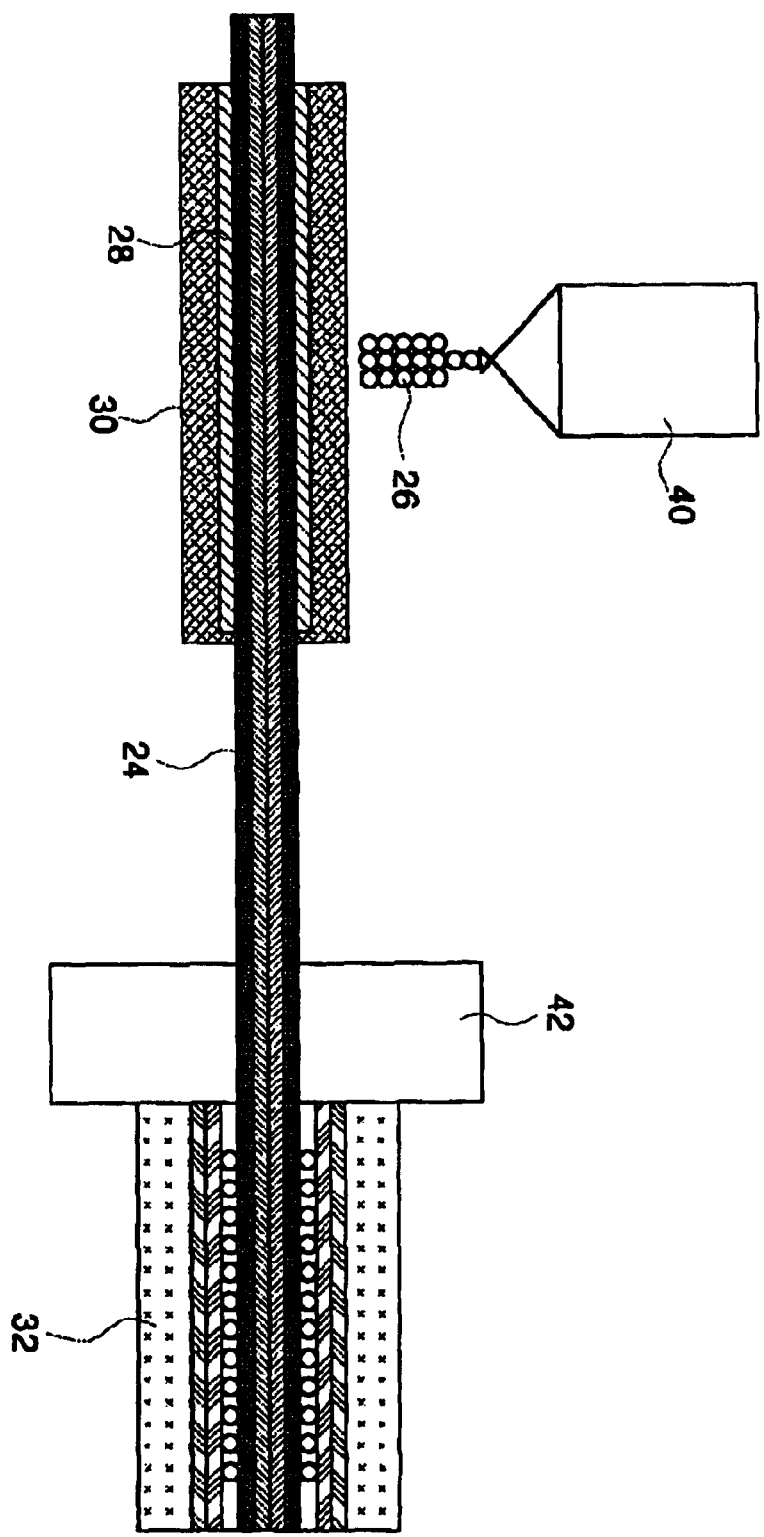
FIG. 10 is schematic view showing a process of manufacturing a bundle tube type optical cable according to the present invention.

FIG. 10 is schematic view showing a process of manufacturing a bundle tube type optical cable according to the present invention.

Referring to FIG. 10, the process of manufacturing the optical cable (B, C and D) according to the present invention will now be described.

Firstly, a plurality of optical fiber tubes 24 each containing a plurality of optical fiber cores 20 are arranged in the middle of the optical cable. Next, a second water-blocking layer 26 is formed in the exterior of the optical fiber tubes 24 with a predetermined gap by injecting a mixed powder of water-blocking powder and inorganic powder using a powder applicator 40 while wrapping the inner shell 30 of aluminum.

At this time, one surface or opposite surfaces of the inner shell 30 of aluminum are already coated with thermoplastic resin, no process for forming the inner shell in a circle is required. Also, since the aluminum constituting the inner shell 30 has flexibility unlike the steel tape, no process for forming a corrugation is required. Thusly, it is possible to manufacture an optical cable having desired mechanical and physical properties by a much simplified process as compared to the conventional art.

After the water-blocking layer forming process, the optical fiber tube 24 wrapped with the inner shell 30 of aluminum material is moved to an extruder cross head 42 and an outer sheath 32 is stacked on the outer circumferential surface thereof, thereby completing the optical cable (B) of FIG. 7.

While, as described above, the optical cable (C) of FIG. 8 can be manufactured by embedding a water-blocking tape 28 into the inner shell 30 of aluminum in a longitudinal direction. In addition, the optical cable (C) provides tension wires 34 being buried in the outer sheath 32 of plastic material. Also, as described above, the optical cable. (D) of FIG. 9 can be manufactured by additionally forming the steel tape 36 and the epidermal layer 38 on the outer circumferential surface of the outer sheath 32 of the optical cable. Also, the optical cable (D) provides tension wires 34 being arranged between the outer sheath 32 and the inner shell 30 of aluminum material.

As mentioned above, according to the present invention, the optical fiber tubes are completely separated from the outer sheath by surrounding the exterior of the optical fiber tubes each containing a plurality of optical fibers with a double layer structure of an inner shell of aluminum and an outer sheath of polyethylene. Therefore, the optical fibers can be protected from the impact transferred from the outside and the pressure by the outer sheath and can be prevented from moisture penetration into the optical cable, resultantly greatly improving the pressure properties and waterproofing properties of the optical cable.

Further, since the aluminum constituting the inner shell has flexibility, the optical cable can be bent well even if a separate corrugation is not formed unlike the conventional art, for thereby improving the bending properties. In this way, since there is no need to form a corrugation to improve the bending properties of the optical cable, it is possible to manufacture an optical cable having excellent mechanical and physical properties by a simple process. This fact tells us that the optical cable of the present invention is excellent from a viewpoint of the yield of the product and economic efficiency.

Moreover, in the conventional optical cable, the outer sheath of plastic material formed around the optical fiber tubes may be shrunken according to a temperature change and accordingly the characteristics of the optical cable are degraded because the optical fibers are given pressure by the outer sheath by the shrinking phenomenon of the entire optical cable. However, in the present invention, the inner shell of aluminum can prevent the shrinking of the outer sheath to thus sharply improve the low temperature characteristic of the optical cable too.

What is claimed is:

1. A bundle tube type optical cable, comprising:
   a bundle of optical fiber tubes being arranged in the middle portion of the optical cable and each containing at least two optical fiber cores loosely arranged therein;
   a first water-blocking layer protecting the optical fiber cores in the optical fiber tube from external moisture by a water-blocking material filled in the inner space of the tube;
   an inner shell made of aluminum material enclosing the bundle of optical fiber tubes with a predetermined gap;
   a second water-blocking layer protecting the optical fiber tubes from external moisture by the water-blocking material filled in the inner space of the inner shell; and
   an outer sheath made of plastic material enclosing the outer surface of the inner shell.

2. The optical cable of claim 1, wherein the water-locking material of the first water-blocking material and the second water-blocking material is a mixed powder of water-blocking powder and inorganic powder.

3. The optical cable of claim 2, wherein the inorganic powder includes any one material selected from group consisting of talc, carbonate and silicate.

4. The optical cable of claim 2, wherein the water-blocking powder includes any one material selected from the group consisting of sodium carboxymethyl cellulose, polyacrylic acid salt and poly vinyl alcohol-sodium acrylate.

5. The optical cable of claim 2, wherein the proportion of the water-blocking powder in the total weight of the mixed powder is less than 70% by weight.

6. The optical cable of claim 1, wherein the inner shell of aluminum material has a tensile strength of 7~9 kg/25 mm$^2$ and a longitudinal elongation of more than 25% and includes high purity aluminum containing more than 99.3% aluminum.

7. The optical cable of claim 6, wherein one surface or opposite surfaces of the inner shell of aluminum are coated with thermoplastic resin.

8. The optical cable of claim 1, wherein the optical fiber tube has an outer diameter of less than 2.0 mm and a thickness of less than 0.2 mm.

9. The optical cable of claim 1, wherein the optical fiber tube contains 24 or less optical fiber cores.

10. The optical cable of claim 1, wherein the optical fiber tube has an optical fiber lamination factor of more than 60% which is calculated by the following formula:

$$\text{Optical Fiber Lamination Factor} = \pi \times R_e^2 / \pi \times R_t^2$$

(wherein $R_e$ is the reduced radius of the optical fiber cores (the radius of a circle on the assumption that a plurality of optical fiber cores is one circle), and $R_t$ is the internal radius of the optical fiber tube).

11. The optical cable of claim 1, wherein the optical fiber tube is made of any one material selected from the group consisting of poly vinyl chloride (PVC), polyester amide copolymer, soft ethylene-propylene copolymer, styrene-butadiene rubber, polyethylene, ethylene vinyl acetate (EVA), and polyester elastomer.

12. The optical cable of claim 1, wherein the optical cable further comprises a water-blocking tape provided on the inner surface of the inner shell of aluminum material.

13. The optical cable of claim 1, wherein the optical cable further comprises cable tension wires being buried in the outer sheath of plastic or being arranged between the outer sheath and the inner shell of aluminum.

14. The optical cable of claim 1, wherein the optical cable further comprises a steel tape provided on the outer circumferential surface of the outer sheath of plastic material and an epidermal layer of plastic provided on the outer circumferential surface of the steel tape.

* * * * *